No. 611,932. Patented Oct. 4, 1898.
A. B. PERINE.
DEVICE FOR CONVERTING RECIPROCATORY INTO ROTARY MOTION.
(Application filed Sept. 30, 1897.)
(No Model.)
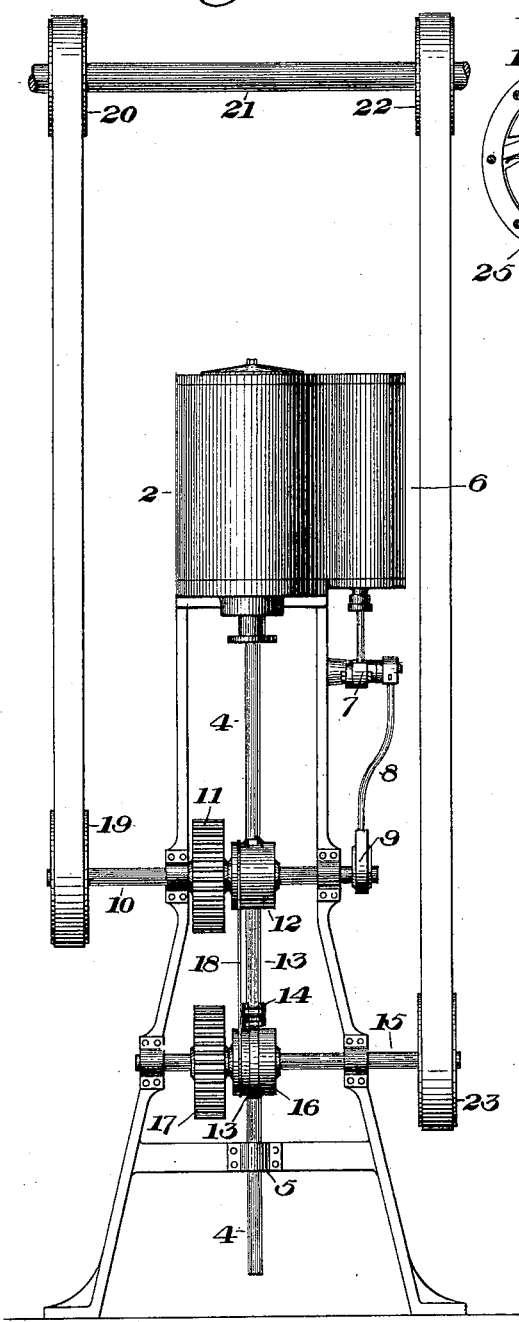
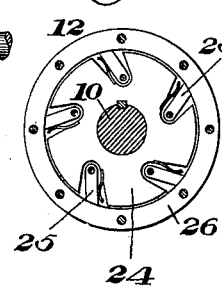
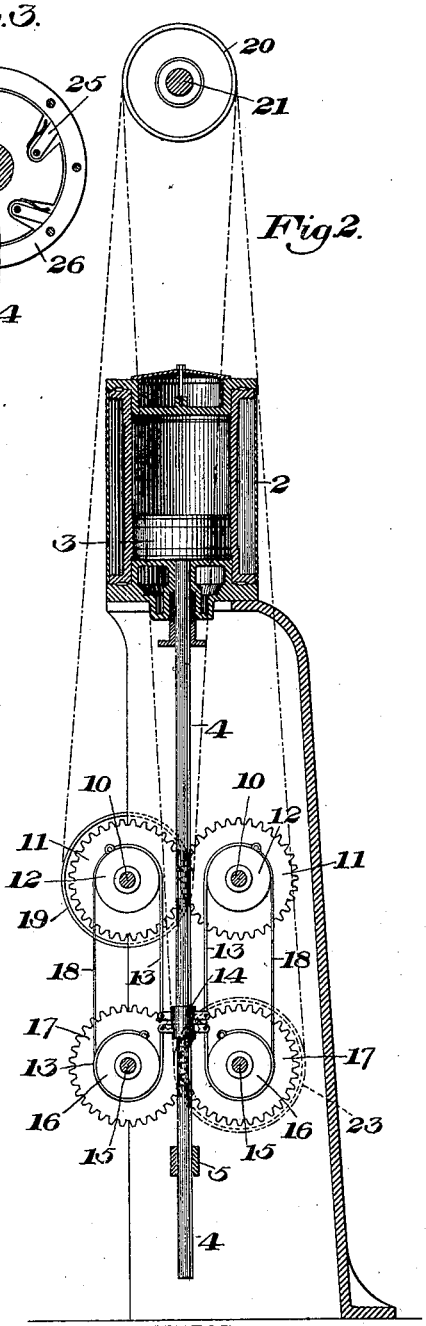
WITNESSES
A. M. Corwin
George Blemming
INVENTOR
Aaron B. Perine
by Bakewell & Bakewell
his Attorneys.

UNITED STATES PATENT OFFICE.

AARON B. PERINE, OF TOPEKA, KANSAS, ASSIGNOR OF ONE-HALF TO CHARLES T. RUSSELL, OF ALLEGHENY, PENNSYLVANIA.

DEVICE FOR CONVERTING RECIPROCATORY INTO ROTARY MOTION.

SPECIFICATION forming part of Letters Patent No. 611,932, dated October 4, 1898.

Application filed September 30, 1897. Serial No. 653,596. (No model.)

*To all whom it may concern:*

Be it known that I, AARON B. PERINE, of Topeka, in the county of Shawnee and State of Kansas, have invented a new and useful Improvement in Devices for Converting Reciprocatory into Rotary Motion, of which the following is a full, clear, and exact description, reference being had to the accompanying drawings, forming part of this specification, in which—

Figure 1 is a front elevation showing my device as applied to the cylinder of an ordinary double-acting engine. Fig. 2 is a sectional side elevation of the same, and Fig. 3 is a detail view of one form of clutch I may employ.

My invention relates to the devices employed for converting reciprocatory motion, such as that of the piston-rod of a motive cylinder, into rotary motion, and is designed to provide a device for this purpose which shall fully utilize the energy exerted upon the reciprocatory element and prevent the waste of a portion of this energy, such as now occurs in the ordinary crank and connecting-rod and other devices for this general purpose.

To that end it consists in a new and improved arrangement of clutch devices which are actuated by the reciprocatory element, whereby the pressure is equally distributed and a smooth even action afforded.

In the drawings, 2 represents an ordinary engine-cylinder of the double-acting type, having a piston 3 and piston-rod 4, which extends through a guide 5.

6 is the valve-chest of the cylinder, containing the ordinary valve actuated from rock-shaft 7 by the eccentric-rod 8, extending from the eccentric 9 upon the counter-shaft 10. The shaft 10 is provided with a toothed wheel 11, intermeshing with a similar wheel upon a like counter-shaft located upon the opposite side of the piston-rod, each of these shafts being provided with a friction-clutch 12, having a strap 13 extending to and secured to a hub 14, fastened to the piston-rod. Below the shafts 10 are two similarly-located shafts 15 15, having friction-clutches 16 arranged to operate in the opposite direction to that of the clutches 12 and connected by straps to the hub of the piston-rod. The shafts 15 are also provided with intermeshing pinions 17, and each shaft 15 is connected by a belt 18 with the corresponding shaft 10 above the same, these belts preferably extending over the casings of the friction-clutches. One of the shafts 10 is provided with a pulley 19, which is belted to a pulley 20 on the driven shaft 21, which shaft is also provided with a pulley 22, belted to a pulley 23, secured to one of the shafts 15.

The friction-clutches may be of any usual type, such as that shown in Fig. 3, wherein a disk 24 is keyed to the shaft, this disk having recesses containing pivoted spring-pressed latches 25, which are engaged by a circular casing 26 in one direction of rotation, while they slide over the same in the opposite direction.

The operation of my device is as follows: As the piston of the cylinder moves downwardly it actuates the friction-clutches 12, thereby giving the shafts 10 a partial rotation and imparting a similar partial rotation to the upper shaft 21. As the piston-rod moves upwardly in the opposite direction the lower set of clutches will come into action and through the belt connection of one of their shafts with the upper driven shafts complete the rotary movement thereof, successive impulses of rotation being thus continuously imparted to the driven shaft by the separate clutches acting successively thereon.

It is evident that instead of actuating each set of clutches from the same piston-rod one set may be actuated by the piston-rod of one engine and the other set by that of another engine or reciprocatory motor.

The advantages of my invention result from the fact that the energy imparted to the piston-rod is entirely utilized in imparting rotary motion to the driven shaft instead of, as heretofore, being partially lost in injurious pressure upon the guides of cross-heads, &c.

The use of the clutch devices in pairs is of special advantage, since the pressure is thus equally distributed on each side of the rod and transmitted to the driven shaft. Other forms of clutches, such as mutilated pinions coacting with teeth upon the rod, may be used.

Many other changes in the form and arrangement of the parts may be made without departing from my invention, since

I claim—

1. The combination with a reciprocatory rod, of two pairs of clutch devices each pair being arranged in substantially the same transverse plane on opposite sides thereof, connections between the devices and the rod arranged to drive each pair successively in opposite directions, and actuating connections between the clutches and the driven shaft.

2. The combination with a reciprocatory piston-rod, of a pair of connected clutch devices in substantially the same transverse plane arranged on opposite sides of the rod and connected thereto so as to be driven in one direction of movement of the rod, another pair of connected similarly-arranged clutch devices arranged to be operated by the rod in its opposite movement, and a common driven shaft connected to the clutch devices.

3. The combination with a reciprocatory piston-rod, of a pair of shafts located in substantially the same transverse plane on opposite sides thereof and having intermeshing toothed wheels, clutches upon said shafts arranged to be simultaneously operated by the rod in one direction of its movement, another pair of shafts having similar intermeshing toothed wheels and clutches arranged to be operated by the rod on its movement in the opposite direction, and connections between one shaft of each pair and the common driven shaft.

In testimony whereof I have hereunto set my hand.

AARON B. PERINE.

Witnesses:
R. L. THOMAS,
H. J. WINGART.